United States Patent
Bergeron et al.

(10) Patent No.: US 11,111,848 B1
(45) Date of Patent: Sep. 7, 2021

(54) FUEL INJECTION SYSTEM FOR AIRCRAFT ENGINE

(71) Applicant: PRATT & WHITNEY CANADA CORP., Longueuil (CA)

(72) Inventors: Sebastien Bergeron, St-Bruno-De-Montarville (CA); Etienne Plamondon, Candiac (CA); Jean Thomassin, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/890,660

(22) Filed: Jun. 2, 2020

(51) Int. Cl.
| | |
|---|---|
| F02B 53/02 | (2006.01) |
| F02B 53/10 | (2006.01) |
| F02B 55/08 | (2006.01) |
| F02D 41/40 | (2006.01) |
| F02M 61/10 | (2006.01) |
| F02M 61/18 | (2006.01) |
| F02M 63/00 | (2006.01) |
| F02D 41/38 | (2006.01) |

(52) U.S. Cl.
CPC .............. *F02B 53/10* (2013.01); *F02B 53/02* (2013.01); *F02B 55/08* (2013.01); *F02D 41/403* (2013.01); *F02M 61/10* (2013.01); *F02M 61/18* (2013.01); *F02M 63/0028* (2013.01); *F02D 2041/389* (2013.01)

(58) Field of Classification Search
CPC .......... F02B 53/02; F02B 53/10; F02B 55/08; F02D 41/403; F02D 2041/389; F02M 61/10; F02M 61/18; F02M 63/0028
See application file for complete search history.

(56) References Cited

U.S. PATENT DOCUMENTS

| | | | |
|---|---|---|---|
| 6,439,201 B1 | 8/2002 | Gillis et al. | |
| 6,786,205 B2 | 9/2004 | Stuhldreher et al. | |
| 7,219,655 B2 | 5/2007 | Shingle | |
| 7,431,017 B2 | 10/2008 | Gibson | |
| 7,574,992 B2 | 8/2009 | Lohmann | |
| 8,579,207 B2 | 11/2013 | Sturman | |
| 2014/0261294 A1* | 9/2014 | Thomassin | F01C 1/22 123/209 |
| 2017/0175657 A1* | 6/2017 | Fei | F02D 41/0025 |
| 2019/0120149 A1* | 4/2019 | Berger | F02M 43/04 |

FOREIGN PATENT DOCUMENTS

DE    102010061183 A1 *  6/2012  ............. F02M 51/04

* cited by examiner

*Primary Examiner* — Audrey K Bradley
(74) *Attorney, Agent, or Firm* — Norton Rose Fulbright Canada LLP (57) ABSTRACT

A fuel injection system for an aircraft engine has: a first fuel injector having a first actuation inlet, a first fuel inlet connected to a fuel source, and a first fuel outlet connected to the at least one combustion chamber, the first fuel injector defining a first pressure ratio; a second fuel injector having a second actuation inlet, a second fuel inlet connected to the fuel source, and a second fuel outlet connected to the at least one combustion chamber, the second fuel injector defining a second pressure ratio; and an actuation fluid system having a circuit connected to the first actuation inlet and to the second actuation inlet, the first outlet pressure different than the second outlet pressure by having one or both of the first pressure ratio different than the second pressure ratio and a first actuation pressure different than a second actuation pressure.

20 Claims, 3 Drawing Sheets

FUEL INJECTION SYSTEM FOR AIRCRAFT ENGINE

TECHNICAL FIELD

The application relates generally to aircraft engines and, more particularly, to fuel injection systems used in such engines.

BACKGROUND OF THE ART

An aircraft engine has a fuel injection system for injecting fuel in one or more combustion chambers. In some cases, common-rails are used to distribute the fuel between the injectors. Pressures in such common-rails are very high. Moreover, each injectors injects fuel at the same pressure that is dictated by the common-rail.

SUMMARY

In one aspect, there is provided a fuel injection system for an aircraft engine having at least one combustion chamber of varying volume, comprising: a first fuel injector having a first actuation inlet, a first fuel inlet hydraulically connected to a fuel source, and a first fuel outlet hydraulically connected to the at least one combustion chamber, the first fuel injector defining a first pressure ratio defined as a first outlet pressure at the first fuel outlet to a first inlet pressure at the first fuel inlet; a second fuel injector having a second actuation inlet, a second fuel inlet hydraulically connected to the fuel source, and a second fuel outlet hydraulically connected to the at least one combustion chamber, the second fuel injector defining a second pressure ratio defined as a second outlet pressure at the second fuel outlet to a second inlet pressure at the second fuel inlet; and an actuation fluid system having a circuit hydraulically connected to the first actuation inlet and to the second actuation inlet, the first outlet pressure different than the second outlet pressure by having one or both of the first pressure ratio different than the second pressure ratio and a first actuation pressure from the actuation fluid system different than a second actuation pressure from the actuation fluid system.

In another aspect, there is provided a rotary internal combustion engine, comprising an outer body defining a rotor cavity; a rotor rotatable within the rotor cavity and in sealing engagement with walls of the outer body and defining at least one chamber of variable volume in the rotor cavity; the outer body defining a pilot subchamber communicating with the rotor cavity; a main fuel injector having a tip in communication with the rotor cavity at a location spaced apart from the pilot subchamber, the main fuel injector having a main actuation inlet hydraulically connected to a source of an actuation fluid, a main fuel inlet hydraulically connected to a fuel source, and a main fuel outlet hydraulically connected to the at least one combustion chamber, the main fuel injector defines a main pressure ratio defined as a main outlet pressure at the main fuel outlet to a main inlet pressure at the main fuel inlet; and a pilot fuel injector having a tip in communication with the pilot subchamber, the pilot fuel injector having a pilot actuation inlet hydraulically connected to the source of the actuation fluid, a pilot fuel inlet hydraulically connected to the fuel source, and a pilot fuel outlet hydraulically connected to the at least one combustion chamber via the pilot subchamber, the pilot fuel injector defines a pilot pressure ratio defined as a pilot outlet pressure at the pilot fuel outlet to a pilot inlet pressure at the pilot fuel inlet, an actuation fluid system having a circuit hydraulically connected to the main actuation inlet and to the pilot actuation inlet, the actuation fluid system operable to inject the actuation fluid at a main actuation pressure to the main actuation inlet and to inject the actuation fluid at a pilot actuation pressure to the pilot actuation inlet, the main outlet pressure different than the pilot outlet pressure by having one or both of the main pressure ratio different than the pilot pressure ratio and the main actuation pressure different than the pilot actuation pressure.

In yet another aspect, there is provided a method of injecting fuel into a rotary internal combustion engine having an outer body defining a rotor cavity receiving a rotor rotatable within the rotor cavity and in sealing engagement with walls of the outer body and defining at least one chamber of variable volume in the rotor cavity, a pilot subchamber communicating with the rotor cavity, the method comprising: injecting fuel into the at least one combustion chamber at a main pressure via a main injector by injecting a main actuation fluid into the main injector; and injecting the fuel into the pilot subchamber, while the pilot subchamber is in fluid flow communication with the at least one combustion chamber, at a pilot pressure different than the main pressure via a pilot injector by injecting a pilot actuation fluid into the pilot injector.

DESCRIPTION OF THE DRAWINGS

Reference is now made to the accompanying figures in which.

DETAILED DESCRIPTION

Figure 1:
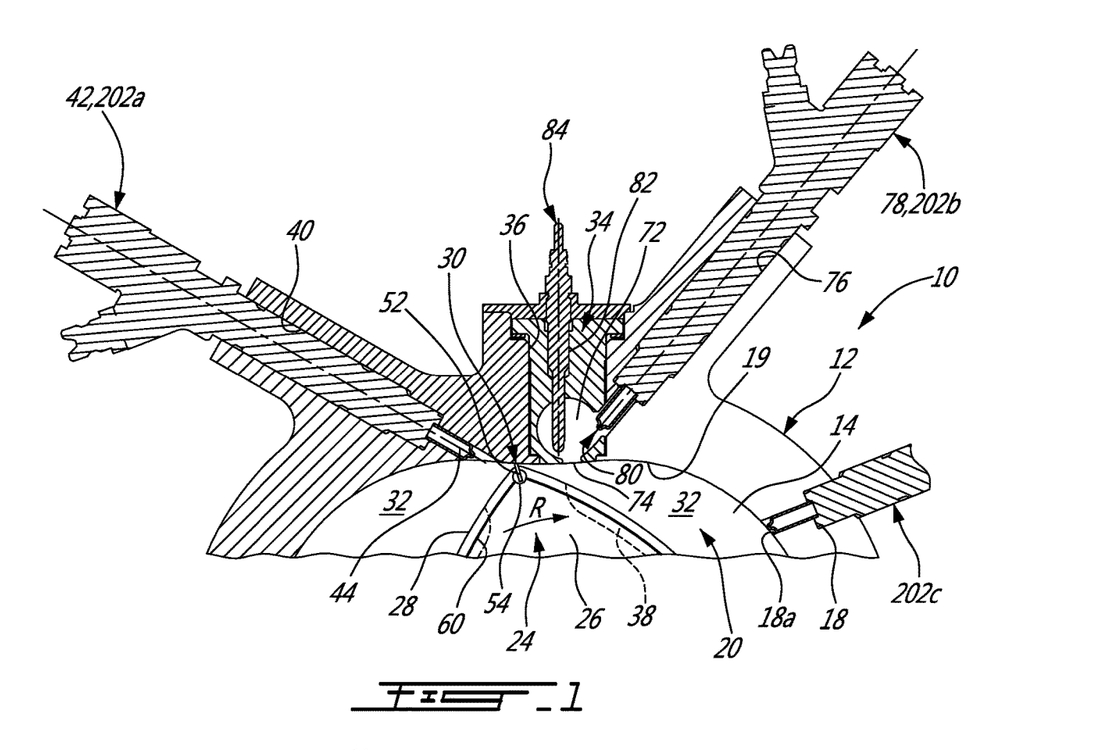
FIG. 1 is a schematic cross-sectional view of a rotary internal combustion engine in accordance with one embodiment, taken in a plane perpendicular to an axial direction of the engine.

Referring to FIG. 1, a rotary internal combustion engine 10 known as a Wankel engine is schematically and partially shown. A description of a rotary engine is present in U.S. Pat. No. 9,353,680, the entire content of which is incorporated herein by reference. The engine 10 comprises an outer body 12 having axially-spaced end walls 14 with a peripheral wall 18 extending therebetween to form a rotor cavity 20. The inner surface 19 of the peripheral wall 18 of the cavity 20 has a profile defining two lobes, which is preferably an epitrochoid.

An inner body or rotor 24 is received within the cavity 20, with the geometrical axis of the rotor 24 being offset from and parallel to the axis of the outer body 12. The rotor 24 has axially spaced end faces 26 adjacent to the outer body end walls 14, and a peripheral face 28 extending therebetween. The peripheral face 28 defines three circumferentially-spaced apex portions 30 (only one of which is shown), and a generally triangular profile with outwardly arched sides. The apex portions 30 are in sealing engagement with the inner surface of peripheral wall 18 to form three rotating working chambers 32 (only two of which are partially shown) between the inner rotor 24 and outer body 12. A recess 38 is defined in the peripheral face 28 of the rotor 24 between each pair of adjacent apex portions 30, to form part of the corresponding chamber 32. It will be appreciated that, in an alternate embodiment, such recesses 38 are absent.

The working chambers 32 are sealed. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof.

Although not shown in the Figures, the rotor 24 is journaled on an eccentric portion of a shaft and includes a phasing gear co-axial with the rotor axis, which is meshed with a fixed stator phasing gear secured to the outer body co-axially with the shaft. The shaft rotates the rotor 24 and the meshed gears guide the rotor 24 to perform orbital revolutions within the rotor cavity. The shaft rotates three times for each complete rotation of the rotor 24 as it moves around the rotor cavity 20. Oil seals are provided around the phasing gear to prevent leakage flow of lubricating oil radially outwardly thereof between the respective rotor end face 26 and outer body end wall 14.

At least one inlet port (not shown) is defined through one of the end walls 14 or the peripheral wall 18 for admitting air (atmospheric or compressed) into one of the working chambers 32, and at least one exhaust port (not shown) is defined through one of the end walls 14 or the peripheral wall 18 for discharge of the exhaust gases from the working chambers 32. The inlet and exhaust ports are positioned relative to each other and relative to the ignition member and fuel injectors (further described below) such that during each rotation of the rotor 24, each chamber 32 moves around the cavity 20 with a variable volume to undergo the four phases of intake, compression, expansion and exhaust, these phases being similar to the strokes in a reciprocating-type internal combustion engine having a four-stroke cycle.

In a particular embodiment, these ports are arranged such that the rotary engine 10 operates under the principle of the Miller or Atkinson cycle, with its volumetric compression ratio lower than its volumetric expansion ratio. In another embodiment, the ports are arranged such that the volumetric compression and expansion ratios are equal or similar to one another.

An insert 34 is received in a corresponding hole 36 defined through the peripheral wall 18 of the outer body 12, for pilot fuel injection and ignition. The peripheral wall 18 also has a main injector elongated hole 40 defined therethrough, in communication with the rotor cavity 20 and spaced apart from the insert 34. A main fuel injector 42 is received and retained within this corresponding hole 40, with the tip 44 of the main injector 42 communicating with the cavity 20 at a point spaced apart from the insert 34. The main injector 42 is located rearward of the insert 34 with respect to the direction R of the rotor rotation and revolution, and is angled to direct fuel forwardly into each of the rotating chambers 32 sequentially with a tip hole pattern designed for an adequate spray.

The insert 34 is made of a material having a greater heat resistance than that of the peripheral wall 18, which in a particular embodiment is made of aluminium. In this particular embodiment, the insert body 46 is made of an appropriate type of ceramic.

The insert 34 has a pilot subchamber 72 defined therein in communication with the rotor cavity 20. In an alternate embodiment, the insert 34 is absent and the pilot subchamber 72 is defined by the peripheral wall 18. In the embodiment shown, the subchamber 72 has a circular cross-section; alternate shapes are also possible. The subchamber 72 communicates with the cavity through at least one opening 74. The subchamber 72 has a shape forming a reduced cross-section adjacent the opening 74, such that the opening 74 defines a restriction to the flow between the subchamber 72 and the cavity 20. The opening 74 may have various shapes and/or be defined by a pattern of multiple holes.

The peripheral wall 18 has a pilot injector elongated hole 76 defined therethrough in proximity of the insert 34, extending at a non-zero angle with respect to a surface of an outer wall of the insert 34, and in communication with the subchamber 72. A pilot fuel injector 78 is received and retained within the corresponding hole 76, with the tip 80 of the pilot injector 78 being received in the subchamber 72.

The insert 34 has an ignition element elongated hole 82 defined therein extending along the direction transverse to the outer body 12, also in communication with the subchamber 72. An ignition element 84 is received and retained within the corresponding hole 82, with the tip 86 of the ignition element 84 being received in the subchamber 72. In the embodiment shown, the ignition element 84 is a glow plug. Alternate types of ignition elements 84 which may be used include, but are not limited to, plasma ignition, laser ignition, spark plug, microwave, etc.

The pilot injector 78 and main injector 42 inject heavy fuel, e.g. diesel, kerosene (jet fuel), equivalent biofuel, etc. into the chambers 32. In a particular embodiment, at least 0.5% and up to 20% of the fuel is injected through the pilot injector 78, and the remainder is injected through the main injector 42. In another particular embodiment, at most 10% of the fuel is injected through the pilot injector 78. In another particular embodiment, at most 5% of the fuel is injected through the pilot injector 78. The main injector 42 injects the fuel such that each rotating chamber 32 when in the combustion phase contains a lean mixture of air and fuel.

Figure 2:
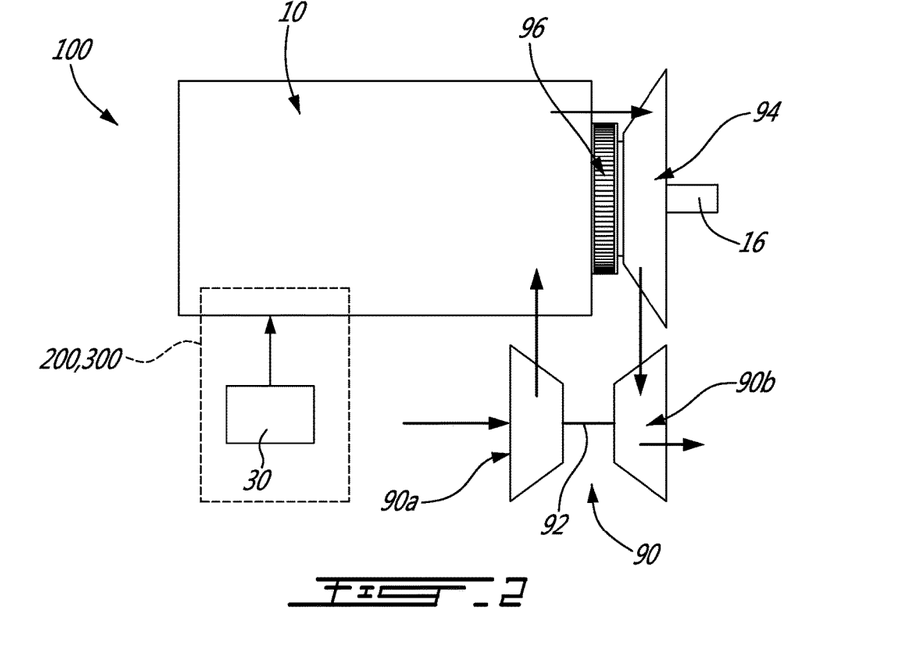
FIG. 2 is a schematic representation of a compound cycle engine in which the internal combustion engine of FIG. 1 may be used.

Referring now to FIG. 2, the rotary engine 10 is used in a compound cycle engine 100, where one or more rotary engines 10 drive a common load connected to an output shaft 16. The compound cycle engine 100 also includes a turbocharger 90, including a compressor 90a and a turbine 90b which are drivingly interconnected by a shaft 92, with the compressor 90a of the turbocharger 90 compressing the air before it enters the rotary engines(s) 12. The exhaust flow from the rotary engine(s) 12 is supplied to a compound turbine 94 in fluid communication therewith, also driving the common load, for example connected to the output shaft 16 through an appropriate type of transmission 96. The exhaust flow from the first stage turbine 94 is supplied to the second stage turbine 90b of the turbocharger 90. In a particular embodiment, the compound cycle engine system is as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein. The compound cycle engine system may be used as a prime mover engine, such as on an aircraft or other vehicle, or in any other suitable application.

Alternatively, the rotary engine 10 may be used without the turbocharger 90 and/or without the compound turbine 94, and with or without one or more other rotary engine(s) 10 engaged to the same output shaft 16. In a particular embodiment, the rotary engine 10 is used as or part of an automobile engine. In a particular embodiment, the rotary engine 10 is used as or part of an aircraft engine (prime mover engine or APU).

Still referring to FIG. 2, the rotary engine 10 is operatively connected to a fuel injection system 200, 300 that includes a fuel source 30, such as a fuel tank. The fuel injection system 200, 300 is used to distribute the fuel to the main fuel injector 42 and the pilot fuel injector 78. It has been discovered by the inventors of the present patent application that, in some cases, it is helpful to vary the pressure of the fuel injected by the main and pilot injectors 42, 78.

However, typical fuel injection systems rely on common-rails. These systems have pumps that generate pressure in the order of from about 30000 PSI to about 50000 PSI. The pressurized fuel is then injected into injectors. A portion of the injected fuel reaches the combustion chamber(s) and a backflow of fuel is generated and flows back to a fuel tank. Since all of the injectors are connected to the common-rail, the pressure of the fuel that is injected into the combustion chamber(s) cannot be varied without adding a second common-rail having a pump increasing the pressure of the fuel at a different value than that of the first common-rail. However, this adds complexity and weight to the system. The present disclosure describes a fuel system including more than one fuel injectors and that is able to inject fuel simultaneously into the same combustion chamber, but at different pressures.

Figure 3:
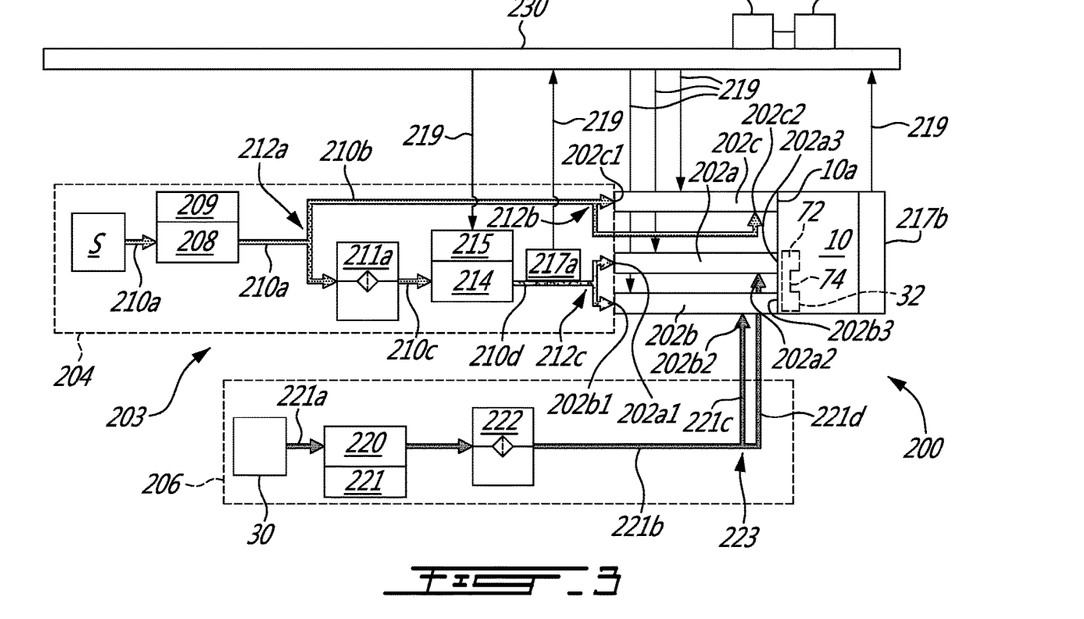
FIG. 3 is a schematic view of a fuel injection system for the engine of FIG. 1 in accordance with one embodiment.

Referring now to FIG. 3, the fuel injection system 200 is shown in greater detail. In the embodiment shown, the system 200 supplies fuel to first and second injectors 202a, 202b of the engine 10; each of the first and second injectors 202a, 202b being in fluid communication with a respective one of the main combustion chamber 32 and the pilot subchamber 72. A third injector 202c is used herein and its function is described below. The system 200 includes an actuation fluid system 203, which includes a circuit 204 hydraulically connected to pump(s) and pressure regulating valve(s), and an injection fluid circuit 206. Those circuits are shown in dashed lines in FIG. 3. The actuation circuit 204 is used to inject an actuation fluid from a source S of the actuation fluid to the injectors 202a, 202b, 202c. The actuation fluid is used by the injectors 202a, 202b to increase a pressure of the injection fluid received therein. More detail about these injectors are presented herein below with reference to FIG. 5. Herein, the actuation fluid is a lubricant, such as oil, and the source S of the actuation fluid is a lubricant reservoir. Other actuation fluids are contemplated. Such actuation fluids may be, for instance, fuel, hydraulic fluid, or any other suitable incompressible fluid. In the embodiment shown, a third injector 202c is used for injecting lubricant into a lubricant port 10a of the engine 10. As shown in FIG. 1, the third injector 202c is received within an aperture 18a of the peripheral wall 18 and is operable to inject lubricant to lubricate an inner surface of the peripheral wall 18 that is in sealing engagement with the rotor 24. Other configurations are contemplated.

Figure 4:
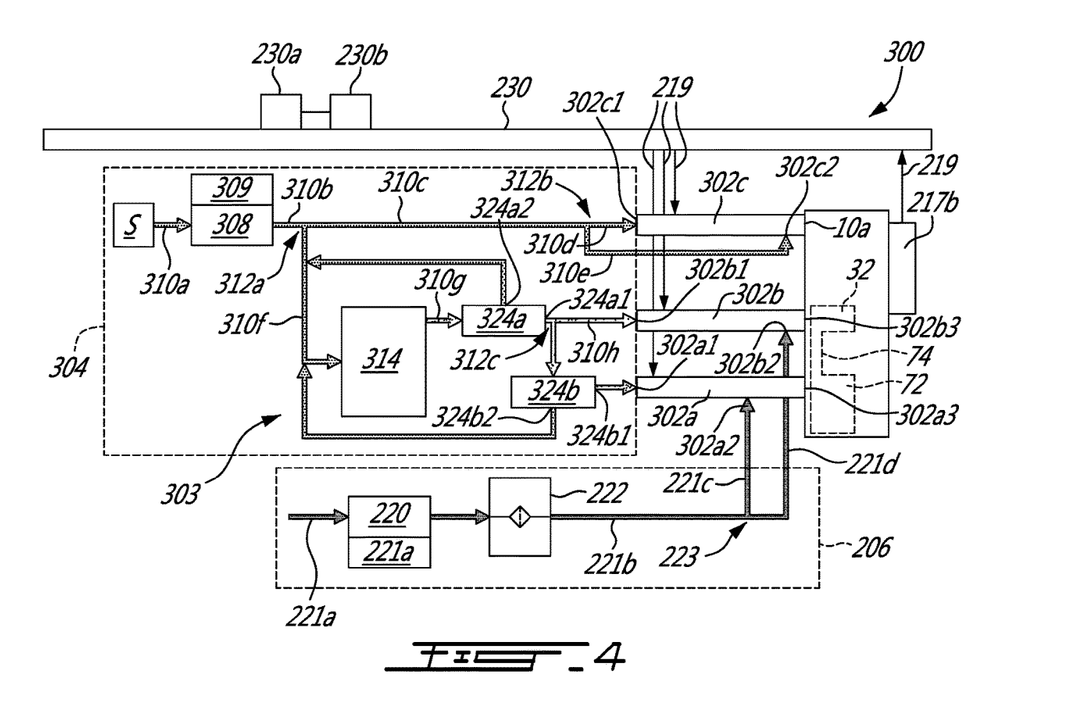
FIG. 4 is a schematic view of a fuel injection system for the engine of FIG. 1 in a accordance with another embodiment.
Figure 5:
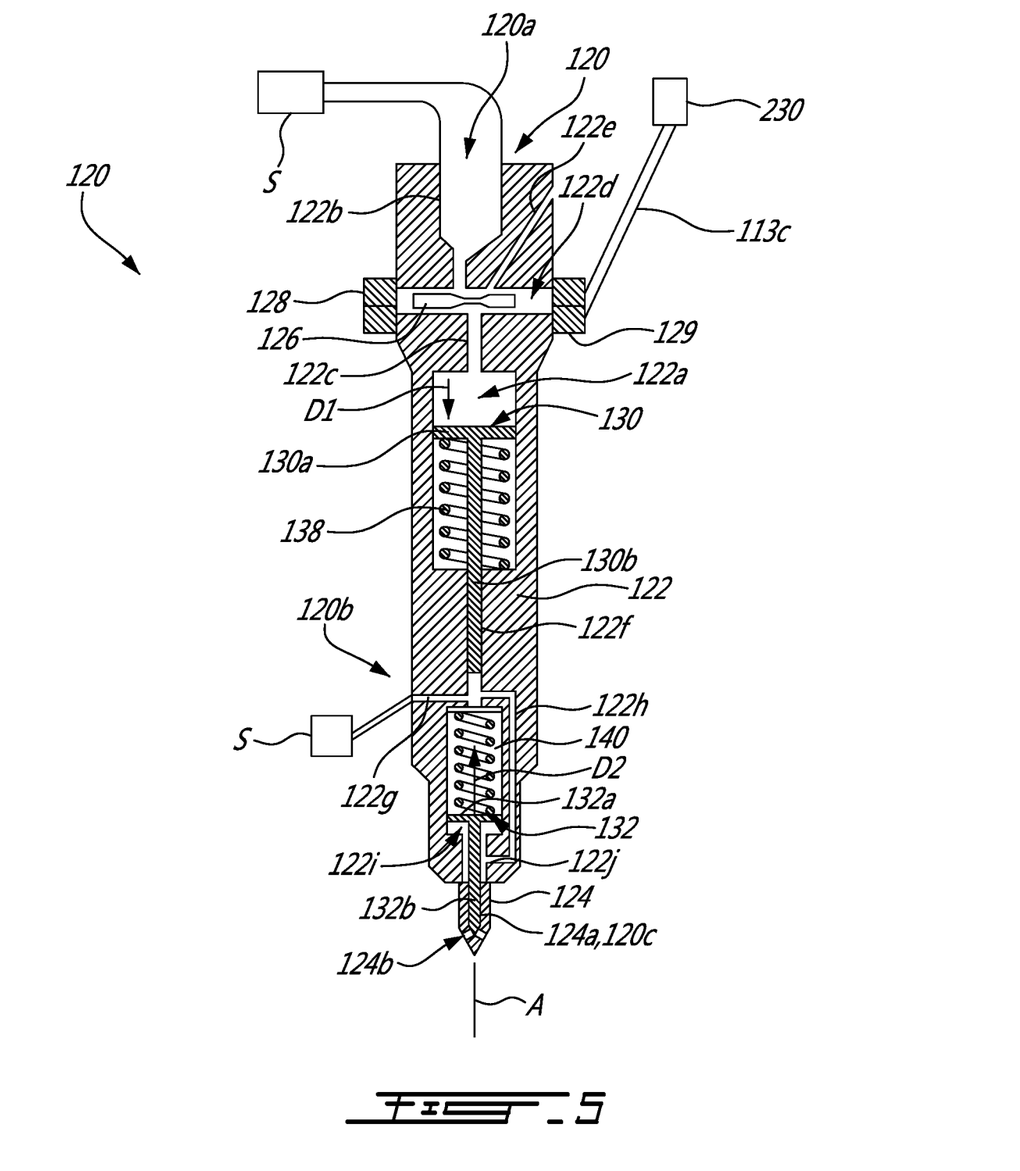
FIG. 5 is a schematic cross-sectional view of an intensifier injector according to one embodiment, which is used with the fuel injection systems of FIGS. 3 and 4.

Referring now to FIG. 5, there is shown an exemplary embodiment of an injector 120. In the embodiment shown in FIGS. 3-4, all of the injectors 202a, 202b, 202c, 302a, 302b, 302c are intensifier injectors as described below with reference to FIG. 5. The injector 120 is an intensifier injector and has two inlets, namely, an actuation inlet 120a and a fuel inlet 120b. The fuel inlet 120b is a lubricant inlet for the third injectors 202c, 302c, which are used to inject lubricant into the engine 10. Herein, an intensifier injector refers to an injector able to create a pressure ratio between an outlet and an inlet of said injector. In the embodiment shown, the pressure ratio is greater than one such that the fuel pressure at the outlet is greater than that at the inlet. Other pressure ratios are contemplated. Herein, the intensifier injector is a pressure-intensified hydraulically-actuated electronically-controlled injector.

The injector 120 has a body 122 and a nozzle 124 protruding axially from the body 122 along an injector axis A. The actuation inlet 120a and the fuel inlet 120b are defined in the body 122. The nozzle 124 defines a fuel outlet 120c of the injector 120 via which the fuel exits the injector 120 to be injected into a combustion chamber. The body 122 defines an internal actuation chamber 122a that is hydraulically connectable to the actuation circuit 204 via a first internal passage 122b and a second internal passage 122c both defined in the body 122. In the embodiment shown, a spool valve 126 is slidingly received within a valve chamber 122d defined in the body 122 of the injector 120. The valve chamber 122d is located between the first and second internal passages 122b, 122c of the body 122 of the injector 120. The injector 120 has an open state in which the fuel is able to exit the injector 120 via the fuel outlet 120c upon the actuation fluid received within the injector 120 and a closed state in which the fuel is limited from exiting the injector 120.

The spool valve 126 translates relative to the body 122 and within the valve chamber 122d along an axis transverse to the injector axis A. The spool valve 126 allows selective fluid communication between the source S (FIG. 3) of the actuation fluid and the internal chamber 122a or between the internal chamber 122a and a vent passage 122e defined by the body 122. In other words, the spool valve 126 is movable between a first position in which the source S of the actuation fluid is hydraulically connected to the internal chamber 122a and disconnected from the vent passage 122e, and a second position in which the source S is disconnected from the internal chamber 122a and in which to the vent passage 122e is hydraulically connected to the internal chamber 122a for draining the actuation fluid out of the internal chamber 122a. The vent passage 122e is hydraulically connected to the source S for receiving the actuation fluid discarded by the injector 120. Further detail about the operation of the injector 120 are presented herein below.

In the embodiment shown, an electromagnet 128 is disposed around the body 122 of the injector 120 at an axial location relative to the injector axis A that registers with the spool valve 126. The electromagnet 128 is operatively connected to an engine control unit (ECU) 230 (FIG. 3) of the engine 10. The ECU 230 is operable to send signals to the electromagnet 128 to magnetize said electromagnet 128 to bias the spool valve 126 in either one of the first and second positions described above. More details about the operation of the injector 120 are presented herein below.

In the embodiment shown, the moving of the valve 126 includes electrifying the electromagnet 128. The moving of the valve 126 includes, magnetically moving the valve 126 from the first position to the second position. In the embodiment shown, the ECU 230 receives signal from a second electromagnet 129 disposed around the spool valve 126; the signal indicates to the ECU 230 if the spool valve 126 was effectively moved to the desired one of the first and second positions by the electromagnet 128. If the ECU 230 determines that the spool valve 126 was not moved to the desired one of the first and second positions based on the signal received from the second electromagnet 129, the ECU 230 moves the spool valve 126 to the desired one of the first and second positions by electrifying the second electromagnet 129.

The injector 120 has a piston assembly 130 including a piston 130a that is slidably received within the internal chamber 122a. A diameter of the piston 130a matches that of the internal chamber 122a such that a sealing engagement is defined between corresponding peripheral walls of the internal chamber 122a and piston 130a. It will be appreciated that a sealing member, such as an O-ring, may be located radially between the peripheral walls of the internal chamber 122a and the piston 130a. The piston assembly 130 is movable back and forth along the injector axis A. The piston 130a is secured to a shank 130b protruding therefrom along the injector axis A. The shank 130b of the piston 130 is slidingly received within a third internal passage 122f defined by the body 122 of the injector 120. A diameter of the shank 130b matches that of the third internal passage 122f such that a sealing engagement is defined between the peripheral walls of the third internal passage 122f and shank 130b. A sealing member may be disposed therebetween.

The body 122 of the injector 120 further defines an injection fluid inlet passage 122g and an injection fluid outlet passage 122h. The injection fluid inlet passage 122g has an inlet hydraulically connected to the source S and an outlet hydraulically connected with the second internal passage 122f. The injection fluid outlet passage 122h has an inlet hydraulically connected to the second internal passage 122f. The fuel inlet 120b of the injector 120 corresponds to the inlet of the injection fluid inlet passage 122g. In the embodiment shown, a one-way valve is located in the passage 122g to limit the oil from flowing back toward the oil source via the internal passage 122g when the piston 130 is pushed down. The oil inlet 120b of the injector 120 corresponds to the inlet of the injection fluid inlet passage 122g.

The body 122 of the injector 120 further defines an injection internal chamber 122i. The injector 120 includes a needle assembly 132 axially movable relative to the injector axis A. The needle assembly 132 has a second piston 132a slidingly received within the injection internal chamber 122i and a needle 132b protrudes axially from the piston 132a. Diameters of the second piston 132a and the injection internal chamber 122i matches such that a sealing engagement is defined therebetween. Again, a sealing member may be disposed therebetween.

The needle 132b is partially received within the injection internal chamber 122i and partially received within a fourth internal passage 122j; the fourth internal passage 122j communicating with the injection internal chamber 122i and with an internal passage 124a defined by the nozzle 124. An outlet of the injection fluid outlet passage 122h is hydraulically connected the fourth internal passage 122j of the injector 120.

The needle 132b is movable along the injector axis A and relative to the body 122 of the injector 120 between a first position in which the needle 132b defines a sealing engagement with the nozzle 124 thereby limiting fluid flow communication via outlets 124b of the nozzle 124 and a second position in which the needle 132b is spaced apart from said outlets 124b thereby allowing the fuel to exit the internal passage 124a of the nozzle 124. In other words, in the first position, the needle 132b is in abutment against an inner wall of the nozzle 124 to block the outlets 124b of the nozzle 124.

Operation of the injector 120 is now described. The actuation fluid is received within the injector 120 via the first internal passage 122b and allowed to fill the internal chamber 122a upon the spool valve 124 being in the first position. By filling the internal chamber 122a, pressure accumulates therein and pushes the piston 130a along the injector axis A toward the nozzle 124 in a downward direction D1. A biasing member 138 located within the internal chamber 122a is thereby compressed. By moving axially along the injector axis A, the fuel that is received within the third internal passage 122f via the injection fluid inlet passage 122g is compressed by the shank 130b and pushed out of the third internal passage 122f via the injection fluid outlet passage 122h. The fuel then reaches the injection internal chamber 122i via the fourth internal passage 122j. A pressure build-up is created within the injection internal chamber 122i that pushes the second piston 132a away from the nozzle 124 in an upward direction D2 and along the injector axis A thereby compressing a second biasing member 140 and creating a gap between the needle 132b and the inner wall of the nozzle 124 thereby uncovering the outlets 124b of the nozzle 124 and allowing the fuel received within the injection internal chamber 122i to exit said chamber 122i via the internal passage 124a of the nozzle 124. The first and second biasing members 138, 140 are calibrated in function of the desired pressure of the fuel at the fuel outlet 120c. In the embodiment shown, the biasing members 138, 140 are used to bring the first and second pistons to their initial position when pressures re-equilibrate when the spool valve is brought back into the second position and injection is no longer required. The biasing members 138, 140 are calibrated to maintain a proper dynamic of the system.

When injection of the fuel is no longer required, the electromagnet 128 is energized to move the spool valve 126 from the first position to the second position in which fluid flow communication between the source S and the internal chamber 122a is limited. By being in the second position, the spool valve 126 allows the internal chamber 122a to communicate with the vent passage 122e and allows the actuation fluid to exit the internal chamber 122a. More specifically, in the second position of the spool valve 126, there is no more actuation fluid received in the internal chamber 122a from the source S and a fluid path is created between the internal chamber 122a and the vent passage 122e. Therefore, the first biasing member 138 is able to push on the piston 130a to decrease an effective volume of the internal chamber 122a thereby pushing the actuation fluid contained therein out of the injector 120 via the vent passage 122e. The injected actuation fluid may then be flown back to the source S. Other configurations are contemplated. In a particular embodiment, the actuation fluid exiting the injector 120 via the vent passage 122e may be flown to other components.

As shown in FIG. 5, a cross-sectional area of the piston 130a taken along a plane normal to the injector axis A is greater than that of the shank 130b. Therefore, this difference in surface area allows the injector 120 to impart an increase in pressure between that received in the internal chamber 122a and that at the fuel outlet 120c of the injector 120. This pressure increase varies in function of a ratio of the piston cross-sectional area to the shank cross-sectional area; the greater this ratio, the greater the pressure increase.

The injector 120 is able to control a quantity of fuel injected by varying a time duration in which the spool valve 126 remains in the first position. This time duration is calculated by the ECU 230 in function of operating parameters of the engine 12. These parameters include, for instance, the actuation fluid temperature, the actuation fluid pressure, the speed of engine 12, a temperature of a liquid coolant of the engine 10 and so on. Sensors may be used to measure those parameters.

Referring back to FIG. 3, each of the injectors 202a, 202b, 202c operates as describe above with reference to FIG. 5 and are characterized by a respective pressure ratio. In the embodiment shown, the first injector 202a has a pressure ratio of 5 to 1. The second injector 202b has a pressure ratio of 10 to 1. In the embodiment shown, the first injector 202a is operatively connected to the pilot subchamber 72 (FIG. 1) of the rotary engine 10. In the embodiment shown, the third injector has a pressure ratio of 1 to 1. In the embodiment shown, the third injector 202c is used to inject oil in a location in need of lubrication. The third injector 202c may be used to supply the oil to carry other function, for instance, to power an actuator of the engine 10. The pressure ratio is the ratio of a pressure of the injection fluid (e.g., fuel) at the fuel outlet 120c (FIG. 5) of the injector to that at the fuel inlet 120b (FIG. 5) thereof. The pressure ratios of the injectors may range from 1 to 10. Other values are contemplated.

The actuation system and circuit 203, 204 of the fuel injection system 200 are described herein below following a direction of the actuation fluid flowing therein from the source S of the actuation fluid to the injectors 202a, 202b, 202c. Then, the injection circuit 206 of the fuel injection system 200 is described following a direction of the fuel from the fuel source 30 to the injectors 202a, 202b.

The actuation fluid is drawn from the source S by a low-pressure pump 208 of the system 203 hydraulically connected to the source S of the actuation fluid. In the embodiment shown, the actuation fluid pressure at an outlet of the low-pressure pump 208 is from about 200 to about 500 PSI. The low-pressure pump 208 is operatively connected to a pressure regulating valve 209 to maintain a pressure exiting the low-pressure pump 208 substantially constant. The actuation fluid flows via a first conduit 210a to a first splitter 212a where it is divided in a first portion flowing toward the first and second injectors 202a, 202b and a second portion flow towards the third injector 202c. The first splitter 212a has two outlets, one of the two outlets of the first splitter 212a is hydraulically connected to the first and second injectors 202a, 202b and the other of the two outlets of the first splitter 212a is hydraulically connected to the third injector 202c. The first splitter 212a is hydraulically connected to second and third conduits 210b, 210c. The second conduit 210b is hydraulically connected to the third injector 202c and the third conduit 210c is hydraulically connected to the first and second injectors 202a, 202b.

From the first splitter 212a, the actuation fluid flows via the second conduit 210b to both of the actuation inlet 202c1 and the injection inlet 202c2 of the third injector 202c. In the embodiment shown, the actuation fluid flowing toward the inlets 202c1, 202c2 of the third injector 202c is divided in two by a second splitter 212b. The second splitter 212b has two outlets; one of the two outlets of the second splitter 212b is hydraulically connected to the actuation inlet 202c1 of the third injector 202c and the other of the two outlets of the second splitter 212b is hydraulically connected to the injection inlet 202c2 of the third injector 202c. A first portion flows to the actuation inlet 202c1 of the third injector 202c and a second portion flows to the injection inlet 202c2 of the third injector 202c. The actuation fluid injected in the actuation inlet 202c1 of the third injector 202c contributes in pushing the actuation fluid, which is lubricant herein, injected into the injection inlet 202c2 of the third injector 202c as described herein above with reference to FIG. 5. Then, the lubricant is injected into the area in need of lubrication via the lubrication port 10a of the engine 10.

Going back to the first splitter 212a, a remainder of the flow flowing via the first conduit 210a is directed toward the first and second injectors 202a, 202b via the third conduit 210c. A first fuel filter 211a is hydraulically connected to the third conduit 210c downstream of the first splitter 212a. The third conduit 210c is hydraulically connected to a high-pressure pump 214 that draws the actuation fluid from the source S of the actuation fluid and increases its pressure. The high-pressure pump 214 is hydraulically connected downstream of the first filter 211a and downstream of the first splitter 212a. It will be appreciated that the first filter 211a may be located upstream of the splitter 212a. A pressure control valve 215 is operatively connected to the high pressure pump 214 and is used to control a pressure of the actuation fluid at an outlet of the high pressure pump 214. In the embodiment shown, a pressure of the actuation fluid exiting the high-pressure pump is from about 2000 PSI to about 3000 PSI.

From the high-pressure pump 214, the actuation fluid is directed to the first and second injectors 202a, 202b via a high-pressure conduit 210d and via a third splitter 212c. The third splitter 212c divides the flow of the actuation fluid received from the high-pressure pump 214 between the first and second injectors 202a, 202b. The third splitter 212c has two outlets, one of the two outlets of the third splitter 212c is hydraulically connected to the actuation inlet 202a1 of the first injector 202a and the other of the two outlets of the third splitter 212c is hydraulically connected to the actuation inlet 202b1 of the second injector 202b. In the embodiment shown, both of the first and second injectors 202a, 202b receive the actuation fluid at the same pressure. But, as described herein above, the first and second injectors 202a, 202b are characterized by different pressure ratios (e.g., 5 to 1 vs 10 to 1) and, as such, inject fuel received at their injection inlets 202a2, 202b2 into the pilot subchamber 72 and main combustion chamber 32 of the engine 10 at two different pressures via their respective injection outlets 202a3, 202b3. Herein, the fuel pressure injected in to the pilot subchamber 72 is less than that injected in to the main combustion chamber 32.

The injection circuit 206 is now described. The injection circuit 206 includes a low pressure fuel pump 220 that is operable to draw fuel from the fuel source 30 via a fuel conduit 221a and to inject the fuel to a fuel filter 222. The low-pressure fuel pump 220 is operatively connected to a pressure regulating valve 221 to maintain a pressure exiting the low-pressure fuel pump 220 substantially constant. From the fuel filter 222, the fuel is directed toward the first and second injectors 202a, 202b via a fuel conduit 221b. A fuel splitter 223 is hydraulically connected to the fuel conduit 221b and divides the flow of fuel in two. Two fuel conduits 221c, 221d stems from the fuel splitter 223 and are each hydraulically connected to a respective one of the injection inlets 202a2, 202b2 of the first and second injectors 202a, 202b. In other words, the fuel splitter 223 has two outlets; one of the two outlets of the fuel splitter 223 is hydraulically connected to the injection inlet 202a2 of the first injector 202a and the other of the two outlets of the fuel splitter 223 is hydraulically connected to the injection inlet 202b2 of the second injector 202b. It will be appreciated that other configurations of the fuel circuit are contemplated. For instance, each of the first and second injector 202a, 202b may be hydraulically connected to a respective one of two different fuel sources (e.g., two fuel tanks). In the embodiment shown, the pressures of the fuel at the injection inlets 202a2, 202b2 of the first and second injectors 202a, 202b are the same.

In the embodiment shown, the engine control unit (ECU) 230 is operatively connected to the engine 10 and the fuel injection system 200. The ECU 230 is operatively connected to the pressure control valve 215, to a pressure sensor 217a, which is operatively connected to the high-pressure conduit 210d between the high pressure pump 214 and the third splitter 212c, to each of the first, second, and third injectors 202a, 202b, 202c, and to a speed sensor 217b, which is operatively connected to the engine 10 to measure a rotation speed of a shaft of the engine 10. Suitable communication links 219, which may be wired or wireless, are used to connect the ECU 230 to the above mentioned components. The ECU 230 receives data from the pressure sensor 217a and the speed sensor 217b and generates operational parameters and sends signals to the pressure control valve 215 and to the injectors 202a, 202b, 202c to control injection of the fuel into the combustion chamber 72, 32 of the engine 10. These signals are used to control, for instance, the pressure of the actuation fluid, the pressure of the fuel injected into the engine 10, the duration of injection, the quantity of fuel injected. The ECU 230 is operatively connected to the electromagnets 128 (FIG. 5) of each of the injectors 202a, 202b, 202c for controlling whether each of said injectors are in their open or closed states.

The ECU 230 is able to control a duration of the injection, the actuation fluid pressure, a voltage of the ignition element 84 (FIG. 1), which is a glow plug in the embodiment shown, timing of the injection, and so on. The ECU is able to control voltage and current using a specific profile to open up the injector needle at a specific time compared to crank angle (e.g., angular position of the rotor within the outer body.). In a particular embodiment, the ECU 230 controls the first and second injectors 202a, 202b such that the fuel is injected respectively into the main and pilot subchamber simultaneously. In some cases, a small delay between the fuel injection of the first and second injectors is possible. In a particular embodiment, a maximum delay between an injection of fuel into the pilot subchamber and an injection of fuel into the main chamber is at most 0.002 second. In the embodiment shown, the first and second injectors 202a, 202b inject fuel respectively into the pilot and main combustion chambers 72, 32 while the pilot subchamber 72 is in fluid flow communication with the main chamber 32.

In the embodiment shown, the fuel is injected at the same pressures to the injection inlets 202a2, 202b2 of the first and second injectors 202a, 202b and the actuation fluid is injected into the actuation inlets 202a1, 202b1 at the same pressures. Since each of the first and second fuel injectors 202a, 202b has its own pressure ratio (e.g., 5 to 1 and 10 to 1), the pressure of the fuel injected in the combustion chambers via the injection outlets 202a3, 202b3 of the first and second injectors 202a, 202b are different.

Still referring to FIG. 3, the ECU 230 includes a processing unit 230a and a computer-readable medium 230b operatively connected to the processing unit 230a and have instructions stored thereon executable by the processing unit 230a for receiving data from the sensors 217a, 217b; determining a main injection profile and a pilot injection profile of the main and pilot fuel injectors in function of the received data; and injecting the fuel in the at least one combustion chamber per the determined injection profile. In the present embodiment, the determining of the main injection profile and the pilot injection profile includes determining main and pilot frequencies of injection of the fuel and/or main and pilot amounts of fuel to be injected. In the embodiment shown, receiving the data from the sensors 217a, 217b includes receiving data about a rotational speed of a shaft of the aircraft engine from the speed sensor 217b and/or about a pressure of the main and pilot actuation fluids from the pressure sensor 217a of the sensors. Herein, the injecting of the fuel further includes controlling the outlet pressure of the high-pressure pump 214 with the pressure control valve 215 operatively connected to the ECU 230 and to the high-pressure pump 214.

Referring now to FIG. 4, another embodiment of a fuel system is shown generally at 300. For the sake of conciseness, only elements that differ from the fuel system 200 described herein above with reference to FIG. 3 are described herein below. The fuel system 300 includes an actuation system 303 including an actuation circuit 304, which is shown in dashed line, and the fuel circuit 206, which corresponds to the fuel circuit 206 of the system 200 described above with reference to FIG. 3. In the embodiment shown, the first, second, and third injectors 302a, 302b, 302c have the same pressure ratio, which may be, for instance, 1, 5, or 10. Other values are contemplated.

The actuation fluid, which may be a lubricant such as oil, is drawn from the source S by a low-pressure pump 308 and flows within a first conduit 310a. The low-pressure pump 308 is operatively connected to a pressure regulating valve 309 to maintain a pressure exiting the low-pressure pump 308 substantially constant. The low-pressure pump 308 is hydraulically connected to a first splitter 312a via a second conduit 310b where it is divided in a first portion flowing toward the third injector 302c and a second portion flows towards the first and second injectors 302a, 302b.

From the first splitter 312a, the actuation fluid flows to both of the actuation inlet 302c1 and the injection inlet 302c2 of the third injector 302c via a third conduit 310c. In the embodiment shown, the actuation fluid flowing toward the inlets 302c1, 302c2 of the third injector 302c is divided in two by a second splitter 312b. A first portion flows to the actuation inlet 302c1 of the third injector 302c via a fourth conduit 310d and a second portion flows to the injection inlet 302c2 of the third injector 302c via a fifth conduit 310e. Similarly to the embodiment described above with reference to FIG. 3, the third injector 302c is used to inject lubricant to the lubrication port 10a of the engine 10.

Going back to the first splitter 312a, the second portion of the flow exiting the low-pressure pump 308 flows toward the first and second injectors 302a, 302b via a sixth conduit 310f. The first splitter 312a is hydraulically connected to a high-pressure pump 314 via the sixth conduit 310f. The high-pressure pump 314 draws the actuation fluid from the source C and increases its pressure. In the embodiment shown, the pressure of the actuation fluid at an outlet of the high-pressure pump 314 is from 2000 PSI to 5000 PSI. The outlet of the high-pressure pump 314 is hydraulically connected to a first pressure regulating valve 324a via a seventh conduit 310g. The first pressure regulating valve 324a has a main outlet 324a1 hydraulically connected to a third splitter 312c and a return outlet 324a2 hydraulically connected to the sixth conduit 310f downstream of the first splitter 312a and upstream of the high-pressure pump 314.

The third splitter 312c has a first outlet hydraulically connected to the actuation inlet 302b1 of the second injector 302b and a second outlet hydraulically connected to a second pressure regulating valve 324b. The second pressure regulating valve 324b has a main outlet 324b1 hydraulically connected to the injection inlet 302a1 of the first injector 302a and a return outlet 324b2 hydraulically connected to the sixth conduit 310f downstream of the first splitter 312a and upstream of the high-pressure pump 314.

The first and second pressure regulating valves 324a, 324b are devices used to maintain substantially constant a pressure at their respective main outlets 324a1, 324b1 regardless of the pressure of the fluid they receive. Each of these devices may include, for instance, a piston being biased in sealing engagement with an opening, which lead to its respective return outlets 324a2, 324b2, via a spring and operable to allow fluid communication via the return outlets 324a2, 324b2 when the fluid pressure is high enough to overcome a biasing force of the spring. Any suitable pressure regulating valve may be used. A pressure control valve differs than a pressure regulating valve since the pressure control valve is operatively connected to the ECU 230 and is able to change a value of the outlet pressure. A pressure regulating valve is fully mechanical and a control valve is in closed loop with the ECU 230. The pressure regulating valves 324a, 324b are mechanical device and are not connected to the ECU 230. In the embodiment shown, an outlet valve pressure of the first pressure regulating valve 324a is different than that of the second pressure regulating valve 324b such that the pressure injected at the actuation inlet 302b1 of the second injector 302b is different than that injected at the actuation inlet 302a1 of the first injector 302a. In the embodiment shown, the pressure at the main outlet 324b1 of the second pressure regulating valve 3324b is less than that at the main outlet 324a1 of the first pressure regulating valve 324a.

In the embodiment shown, the actuation fluid exits the high-pressure pump 314 and flows into the first pressure regulating valve 324a. The first pressure regulating valve 324a is used to regulate the pressure of the actuation fluid exiting the high-pressure pump 314. A portion of the flow exiting the first pressure regulating valve 324a is flown to the second regulating valve 324b to decrease its pressure before injecting the actuation fluid into the first injector 302a. The two pressure regulating valves 324a, 324b are used to vary the pressure of the actuation fluid received at the actuation inlets 302a1, 302b1 of the first and second injectors 302a, 302b such that the pressures at the fuel outlets 302a3, 302b3 are different.

The fuel system 300 includes the fuel circuit 206 that is operable to inject the fuel at the injection inlets 302a2, 302b2 of the first and second injectors 302a, 302b as described herein above with reference to FIG. 3. In the embodiment shown, the fuel is injected at the same pressure to both of the first and second injectors 302a, 302b.

Referring to all Figures, for injecting the fuel into the rotary internal combustion engine, fuel is injected into the at least one combustion chamber at a main pressure via a main injector by injecting a main actuation fluid into the main injector; and the fuel is injected into the pilot subchamber, while the pilot subchamber is in fluid flow communication with the at least one combustion chamber, at a pilot pressure different than the main pressure via a pilot injector by injecting a pilot actuation fluid into the pilot injector.

In the embodiment shown, injecting the fuel into the at least one combustion chamber and injecting the fuel into the pilot subchamber include increasing a fuel pressure within the main injector at a value being greater than a fuel pressure exiting the pilot injector; and/or injecting the main actuation fluid at a main actuation pressure being different than a pilot actuation pressure of the pilot actuation fluid injected into the pilot injector.

The disclosed fluid injection systems 200, 300 may exhibit the flexibility of injecting a fluid able to burn within an internal combustion chamber equipped with multiple injectors within the same combustion chamber at different pressures simultaneously. This may be done without adding complexity to the system. This may allow more flexibility on the injection strategy and may allow to design and optimize the geometry of the pre-chambers (e.g. pilot subchamber) and main chambers in order to improve the overall thermal efficiency and combustion stability. Furthermore, this may give the capability to change the penetration rate of the fluid per injector, control the droplet diameter of the fuel, have a better control of the ignition delay and emissions, optimize the injection duration per injector in close loop with key performance parameters. This concept may be applicable for all engine applications design to burn a fluid. The systems 200, 300 concepts use three injectors and two fluids, which are herein fuel and oil, but the amount of injectors and fluids may be changed. For instance, each of the injectors may be hydraulically connected to a respective one of more than one sources of actuation fluids; and/or hydraulically connected to a respective one of fuel sources. In other words, each injector may be driven by a dedicated actuation fluid to inject a specific fluid (e.g., fuel, lubricant, etc).

In a particular embodiment, the conduits of the disclosed systems 200, 300 are exposed to lower pressures than conduits of common rail systems. In a particular embodiment, the conduits of the disclosed systems are exposed to fluid pressures that are about 10 times lower than those of a common-rail system (e.g., 3000 PSI vs 30000 PSI). The disclosed fuel injection systems include only one high-pressure system. For the same level of complexity, the system may give more flexibility since there may be no extra parts or controllers. The disclosed fuel injection systems 200, 300 may offer better control on penetration rate, droplet diameter, ignition delay, emissions and injection duration. They may offer more flexibility to design and optimize the combustion chambers and may improve cold start and transient manoeuvers within design space. The fuel injection system 300 described above with reference to FIG. 4 allows to identical injectors having the same pressure amplification ratio. This may be advantageous since the part counts of the engine may be lower than that of the system 200 described above with reference to FIG. 3.

Embodiments disclosed herein include:

A. A fuel injection system for an aircraft engine having at least one combustion chamber of varying volume, comprising: a first fuel injector having a first actuation inlet, a first fuel inlet hydraulically connected to a fuel source, and a first fuel outlet hydraulically connected to the at least one combustion chamber, the first fuel injector defining a first pressure ratio defined as a first outlet pressure at the first fuel outlet to a first inlet pressure at the first fuel inlet; a second fuel injector having a second actuation inlet, a second fuel inlet hydraulically connected to the fuel source, and a second fuel outlet hydraulically connected to the at least one combustion chamber, the second fuel injector defining a second pressure ratio defined as a second outlet pressure at the second fuel outlet to a second inlet pressure at the second fuel inlet; and an actuation fluid system having a circuit hydraulically connected to the first actuation inlet and to the second actuation inlet, the first outlet pressure different than the second outlet pressure by having one or both of the first pressure ratio different than the second pressure ratio and a first actuation pressure from the actuation fluid system different than a second actuation pressure from the actuation fluid system.

B. A rotary internal combustion engine, comprising an outer body defining a rotor cavity; a rotor rotatable within the rotor cavity and in sealing engagement with walls of the outer body and defining at least one chamber of variable volume in the rotor cavity; the outer body defining a pilot subchamber communicating with the rotor cavity; a main fuel injector having a tip in communication with the rotor cavity at a location spaced apart from the pilot subchamber, the main fuel injector having a main actuation inlet hydraulically connected to a source of an actuation fluid, a main fuel inlet hydraulically connected to a fuel source, and a main fuel outlet hydraulically connected to the at least one combustion chamber, the main fuel injector defines a main pressure ratio defined as a main outlet pressure at the main fuel outlet to a main inlet pressure at the main fuel inlet; and a pilot fuel injector having a tip in communication with the pilot subchamber, the pilot fuel injector having a pilot actuation inlet hydraulically connected to the source of the actuation fluid, a pilot fuel inlet hydraulically connected to the fuel source, and a pilot fuel outlet hydraulically connected to the at least one combustion chamber via the pilot subchamber, the pilot fuel injector defines a pilot pressure ratio defined as a pilot outlet pressure at the pilot fuel outlet to a pilot inlet pressure at the pilot fuel inlet, an actuation fluid system having a circuit hydraulically connected to the main actuation inlet and to the pilot actuation inlet, the actuation fluid system operable to inject the actuation fluid at a main actuation pressure to the main actuation inlet and to inject the actuation fluid at a pilot actuation pressure to the pilot actuation inlet, the main outlet pressure different than the pilot outlet pressure by having one or both of the main pressure ratio different than the pilot pressure ratio and the main actuation pressure different than the pilot actuation pressure.

Embodiments A and B may include any of the following elements, in any combinations:

Element 1: a high-pressure pump hydraulically connected to both of the first actuation inlet and the second actuation inlet, the first pressure ratio different than the second pressure ratio. Element 2: the first actuation pressure is equal to the second actuation pressure. Element 3: the first pressure ratio is 5 and the second pressure ratio is 10. Element 4: a high-pressure pump hydraulically connected to both of the first actuation inlet and the second actuation inlet, the first actuation inlet hydraulically connected to the high-pressure pump via a first pressure regulating valve and the second actuation inlet hydraulically connected to the high-pressure pump via a second pressure regulating valve, an outlet valve pressure of the first pressure regulating valve different than that of the second pressure regulating valve. Element 5: the first actuation inlet is hydraulically connected to the high-pressure pump via both of the first pressure regulating valve and the second pressure regulating valve. Element 6: the first pressure ratio is equal to the second pressure ratio. Element 7: the first pressure ratio ranges from 1 to 10. Element 8: each injector of the first injector and the second injector has a body, a nozzle defining a fuel outlet of the injector and protruding from the body, and a needle slidingly received within the nozzle, the needle movable from an engaged position in which the needle is sealingly engaged to the nozzle and a disengaged position in which the needle allows fuel to exit the injector. Element 9: the body of the injector defines an actuation chamber hydraulically connected to the circuit and an injection chamber hydraulically connected to the fuel source, a first piston slidingly received within the actuation chamber, a second piston slidingly received within the injection chamber and connected to the needle, movement of the first piston upon reception of the first or second actuation fluid within the actuation chamber pushing the fuel received via the first or second fuel inlet into the injection chamber thereby pushing on the second piston to move the needle from the engaged position toward the disengaged position. Element 10: the first actuation fluid and the second actuation fluid are lubricant from a source of the lubricant. Element 11: a high-pressure pump hydraulically connected to both of the main actuation inlet and the pilot actuation inlet, the main pressure ratio different than the pilot pressure ratio. Element 12: the main actuation pressure is equal to the pilot actuation pressure. Element 13: an engine control unit (ECU) operatively connected to the main fuel injector and the pilot fuel injector, the ECU having a processing unit and a computer readable medium operatively connected to the processing unit and containing instructions executable by the processing unit for: receiving data from sensors of the fuel injection system; determining a main injection profile and a pilot injection profile of the main and pilot fuel injectors in function of the received data; and injecting the fuel in the at least one combustion chamber per the determined injection profile. Element 14: the determining main injection profile and the pilot injection profile includes determining main and pilot frequencies of injection of the fuel and/or main and pilot amounts of fuel to be injected. Element 15: the receiving of the data from the sensors includes receiving data about a rotational speed of a shaft of the aircraft engine from a speed sensor and/or about a pressure of the main and pilot actuation fluids from a pressure sensor of the sensors. Element 16: a high-pressure pump is hydraulically connected to both of the main actuation inlet and the pilot actuation inlet, the injecting of the fuel further comprising controlling an outlet pressure of the high-pressure pump with a pressure control valve operatively connected to the ECU and to the high-pressure pump.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A fuel injection system for an aircraft engine having at least one combustion chamber of varying volume, comprising:

a first fuel injector having a first actuation inlet, a first fuel inlet hydraulically connected to a fuel source, and a first fuel outlet hydraulically connected to the at least one combustion chamber, the first fuel injector defining a first pressure ratio defined as a first outlet pressure at the first fuel outlet to a first inlet pressure at the first fuel inlet;

a second fuel injector having a second actuation inlet, a second fuel inlet hydraulically connected to the fuel source, and a second fuel outlet hydraulically connected to the at least one combustion chamber, the second fuel injector defining a second pressure ratio defined as a second outlet pressure at the second fuel outlet to a second inlet pressure at the second fuel inlet; and an actuation fluid system having a circuit hydraulically connected to the first actuation inlet and to the second actuation inlet, wherein the first fuel injector and the second fuel injector are structurally configured such that the first pressure ratio is different than the second pressure ratio and the first outlet pressure is different than the second outlet pressure, and/or the actuation fluid system includes a first pressure regulating valve hydraulically connected to the first actuation inlet and a second pressure regulating valve hydraulically connected to the second actuation inlet and configured to regulate a first actuation pressure from the actuation fluid system to be different than a second actuation pressure from the actuation fluid system such that the first outlet pressure is different than the second outlet pressure.

2. The fuel injection system of claim 1, wherein the actuation fluid system contains a first and second actuation fluid, wherein the first actuation fluid and the second actuation fluid are lubricant from a source of the lubricant.

3. The fuel injection system of claim 1, wherein each injector of the first injector and the second injector has a body, a nozzle defining a fuel outlet of the injector and protruding from the body, and a needle slidingly received within the nozzle, the needle movable from an engaged position in which the needle is sealingly engaged to the nozzle and a disengaged position in which the needle allows fuel to exit the injector.

4. The fuel injection system of claim 3, wherein the body of the each injector defines an actuation chamber hydraulically connected to the circuit and an injection chamber hydraulically connected to the fuel source, a first piston slidingly received within the actuation chamber, a second piston slidingly received within the injection chamber and connected to the needle, movement of the first piston upon reception of a first or second actuation fluid within the actuation chamber pushing the fuel received via the first or second fuel inlet into the injection chamber thereby pushing on the second piston to move the needle from the engaged position toward the disengaged position.

5. The fuel injection system of claim 1, comprising a high-pressure pump hydraulically connected to both of the first actuation inlet and the second actuation inlet, the first pressure ratio different than the second pressure ratio.

6. The fuel injection system of claim 5, wherein the first actuation pressure is equal to the second actuation pressure.

7. The fuel injection system of claim 5, wherein the first pressure ratio is 5 and the second pressure ratio is 10.

8. The fuel injection system of claim 1, comprising a high-pressure pump hydraulically connected to both of the first actuation inlet and the second actuation inlet, the first actuation inlet hydraulically connected to the high-pressure pump via a first pressure regulating valve and the second actuation inlet hydraulically connected to the high-pressure pump via a second pressure regulating valve, an outlet valve pressure of the first pressure regulating valve different than that of the second pressure regulating valve.

9. The fuel injection system of claim 8, wherein the first actuation inlet is hydraulically connected to the high-pressure pump via both of the first pressure regulating valve and the second pressure regulating valve.

10. The fuel injection system of claim 8, wherein the first pressure ratio is equal to the second pressure ratio.

11. The fuel injection system of claim 10, wherein the first pressure ratio ranges from 1 to 10.

12. A rotary internal combustion engine, comprising:
an outer body defining a rotor cavity;
a rotor rotatable within the rotor cavity and in sealing engagement with walls of the outer body and defining at least one chamber of variable volume in the rotor cavity;
a pilot subchamber defined by the outer body communicating with the rotor cavity;
a main fuel injector having a tip in communication with the rotor cavity at a location spaced apart from the pilot subchamber, the main fuel injector having a main actuation inlet hydraulically connected to a source of an actuation fluid, a main fuel inlet hydraulically connected to a fuel source, and a main fuel outlet hydraulically connected to the at least one combustion chamber, the main fuel injector defines a main pressure ratio defined as a main outlet pressure at the main fuel outlet to a main inlet pressure at the main fuel inlet;
a pilot fuel injector having a tip in communication with the pilot subchamber, the pilot fuel injector having a pilot actuation inlet hydraulically connected to the source of the actuation fluid, a pilot fuel inlet hydraulically connected to the fuel source, and a pilot fuel outlet hydraulically connected to the at least one combustion chamber via the pilot subchamber, the pilot fuel injector defines a pilot pressure ratio defined as a pilot outlet pressure at the pilot fuel outlet to a pilot inlet pressure at the pilot fuel inlet; and
an actuation fluid system having a circuit hydraulically connected to the main actuation inlet and to the pilot actuation inlet;
wherein the actuation fluid system is operable to inject the actuation fluid at a main actuation pressure to the main actuation inlet and to inject the actuation fluid at a pilot actuation pressure to the pilot actuation inlet,
wherein the main fuel injector and the pilot fuel injector are structurally configured such that the main pressure ratio is different than the pilot pressure ratio and the main outlet pressure is different than the pilot outlet pressure, and/or the actuation fluid system includes a first pressure regulating valve hydraulically connected to the main actuation inlet and a second pressure regulating valve hydraulically connected to the pilot actuation inlet and configured to regulate the main actuation pressure from the actuation fluid system to be different than the pilot actuation pressure from the actuation fluid system such that the main outlet pressure is different than the pilot outlet pressure.

13. The rotary internal combustion engine of claim 12, comprising a high-pressure pump hydraulically connected to both of the main actuation inlet and the pilot actuation inlet, the main pressure ratio different than the pilot pressure ratio.

14. The rotary internal combustion engine of claim 13, wherein the main actuation pressure is equal to the pilot actuation pressure.

15. The rotary internal combustion engine of claim 12, comprising an engine control unit (ECU) operatively connected to the main fuel injector and the pilot fuel injector, the ECU having a processing unit and a computer readable medium operatively connected to the processing unit and containing instructions executable by the processing unit for:
receiving data from sensors of the fuel injection system;
determining a main injection profile and a pilot injection profile of the main and pilot fuel injectors in function of the received data; and
injecting the fuel in the at least one combustion chamber per the determined injection profile.

16. The rotary internal combustion engine of claim 15, wherein the determining the main injection profile and the pilot injection profile includes determining main and pilot frequencies of injection of the fuel and/or main and pilot amounts of fuel to be injected.

17. The rotary internal combustion engine of claim 15, wherein the receiving of the data from the sensors includes receiving data about a rotational speed of a shaft of the engine from a speed sensor and/or about a pressure of the main and pilot actuation fluids from a pressure sensor of the sensors.

18. The rotary internal combustion engine of claim 15, wherein a high-pressure pump is hydraulically connected to both of the main actuation inlet and the pilot actuation inlet, the injecting of the fuel further comprising controlling an outlet pressure of the high-pressure pump with a pressure control valve operatively connected to the ECU and to the high-pressure pump.

19. A method of injecting fuel into a rotary internal combustion engine having an outer body defining a rotor cavity receiving a rotor rotatable within the rotor cavity and in sealing engagement with walls of the outer body and defining at least one chamber of variable volume in the rotor cavity, a pilot subchamber communicating with the rotor cavity, the method comprising:

injecting fuel into the at least one combustion chamber at a main pressure via a main injector by injecting a main actuation fluid into the main injector; and injecting the fuel into the pilot subchamber, while the pilot subchamber is in fluid flow communication with the at least one combustion chamber, at a pilot pressure different than the main pressure via a pilot injector by injecting a pilot actuation fluid into the pilot injector.

20. The method of claim 19, wherein the injecting of the fuel into the at least one combustion chamber and the injecting of the fuel into the pilot subchamber includes:

increasing a fuel pressure within the main injector at a value being greater than a fuel pressure exiting the pilot injector; and/or injecting the main actuation fluid at a main actuation pressure being different than a pilot actuation pressure of the pilot actuation fluid injected into the pilot injector.

* * * * *